United States Patent [19]
Rooney

[11] 4,217,081
[45] Aug. 12, 1980

[54] SHOE SOLE MOLDS

[75] Inventor: John P. Rooney, Manchester, Mass.

[73] Assignee: USM Corporation, Farmington, Conn.

[21] Appl. No.: 41,425

[22] Filed: May 22, 1979

[51] Int. Cl.² .................. B29C 1/00; B29C 1/14; B29H 7/08
[52] U.S. Cl. .................. 425/129 S; 249/83; 249/96; 264/244; 425/119
[58] Field of Search ............ 425/119, 129 S, 123, 425/125; 249/96, 83; 264/244

[56] References Cited

U.S. PATENT DOCUMENTS

| | | | |
|---|---|---|---|
| 3,042,975 | 7/1962 | Bingham, Jr. et al. | 264/244 |
| 3,705,934 | 12/1972 | Giannini | 425/119 |
| 3,813,201 | 5/1974 | Frederick et al. | 425/119 |

FOREIGN PATENT DOCUMENTS

| | | | |
|---|---|---|---|
| 2036513 | 12/1970 | France | 425/129 S |
| 1041460 | 9/1966 | United Kingdom | 425/119 |

*Primary Examiner*—James B. Lowe
*Attorney, Agent, or Firm*—Donald N. Halgren; Richard N. Megley; Vincent A. White

[57] ABSTRACT

A mold for forming an article having a complex shape such as a unitary sole and heel tread member for a shoe and method of making same wherein the article to be cast is formed from a material which is injected into the mold in a hot fluid form. The mold for such an article comprises an upper and a lower mold member, which together define a complete shoe sole mold cavity. Each upper or lower mold member may consist of several intermating sections. The lower mold however, comprises a cavity having sufficient depth around its periphery to permit insertion of an inverted decorative welt plus a second decorative piece placed against the wall of the cavity. The upper mold has a cavity which basically defines the tread of the sole, and the two molds interface to provide a tight seal during the shoe sole molding operation.

6 Claims, 3 Drawing Figures

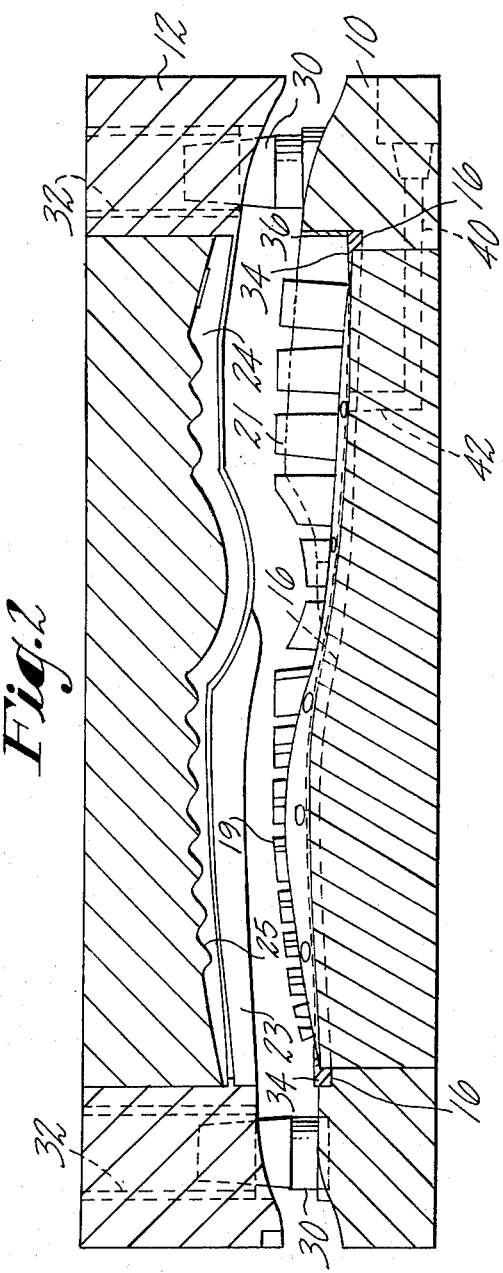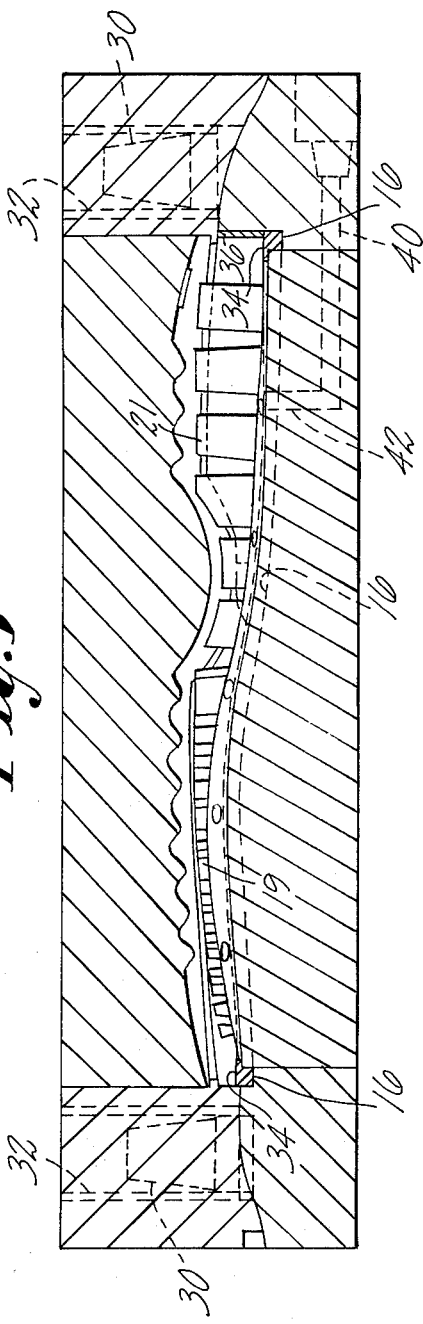

SHOE SOLE MOLDS

BACKGROUND OF THE INVENTION

1. Field of the Invention

The present invention relates to devices used in the manufacture of shoes, and more particularly to shoe sole molds used in the manufacture of unitary shoe soles.

2. Prior Art

Shoe manufacturing has advanced through many stages, from the craftsman sewing leather together and stitching a leather sole to an upper, to the current practice of injection molding a unitary sole and cementing the pre-molded sole to a completed upper.

Changes in styling have necessitated variations in the shape and characteristics of the pre-molded sole. Some of this styling has included embellishments and various ornamentation on the side, as well as the bottoms, of the soles. The ornamentation has included the use of welting on the pre-molded sole to give it the appearance of leather stitched to the top periphery of the sole. In a pre-molded sole this welting has to be placed in the mold and secured there prior to filling of the mold cavity with the sole material. The bottom edges of the welting must be secure to the finished sole. It is difficult to seat the welt material in the mold cavity so that it fits properly and will be secure with the finished sole. Other ornamentation may include a leather or synthetic material insert adapted around the outside surface of the heel. The use of another decorative insert can be almost impossible to accomplish in combination with the welting on the sole, without the use of a more complicated mold arrangement, such as utilizing one mold member for holding the welting, and the other mold member holding the leather heel insert. This may lead to problems of alignment and of matching up the pieces in the mold members as well as having the mold members themselves mate properly, because both mold halves would have to be moved for the machine operator to have access thereto for inserting the ornaments.

Some patents which show sole molding include British Pat. No. 1,520,044; French Pat. No. 2,383,770 and U.S. Pat. No. 3,813,201.

It is an object of the present invention to provide a mold arrangement which permits the use of several ornaments with the molding of a unitary sole.

It is a further object of the present invention to provide a mold arrangement which facilitates the use of several ornamental features therewith, in a simple, efficient and effective manner, in an ordinary molding machine where only one mold half is moved for access thereto by the machine operator.

BRIEF SUMMARY OF THE INVENTION

The present invention comprises an arrangement of upper and lower mold members which together form a complete unit shoe sole mold cavity. The lower mold member is comprised of a mold cavity for at least a portion of the top surface and at least part of the sides of the shoe sole, the cavity having sufficient depth to permit a decorative welt to be inserted around its periphery, and a second decorative piece to be placed adjacent the welt. The upper cavity generally defines the bottom or sole portion of the shoe sole mold. The profile between the two mold members may be curvilinear to facilitate the molding process and to permit the use of a variety of styles of inserts. Each mold may be comprised of several interengagable sections to permit variation in portions of the shoe sole mold.

BRIEF DESCRIPTION OF THE DRAWINGS

The objects and advantages of the invention will become more apparent when viewed in conjunction with the following drawings, in which:

FIG. 2 is a cut-away side elevational view of an upper and a lower mold-half in a premolding orientation; and FIG. 3 is a cut-away side elevational view of an upper and a lower mold-half juxtaposed to form a mold cavity.

DESCRIPTION OF THE PREFERRED EMBODIMENT

Figure 1:
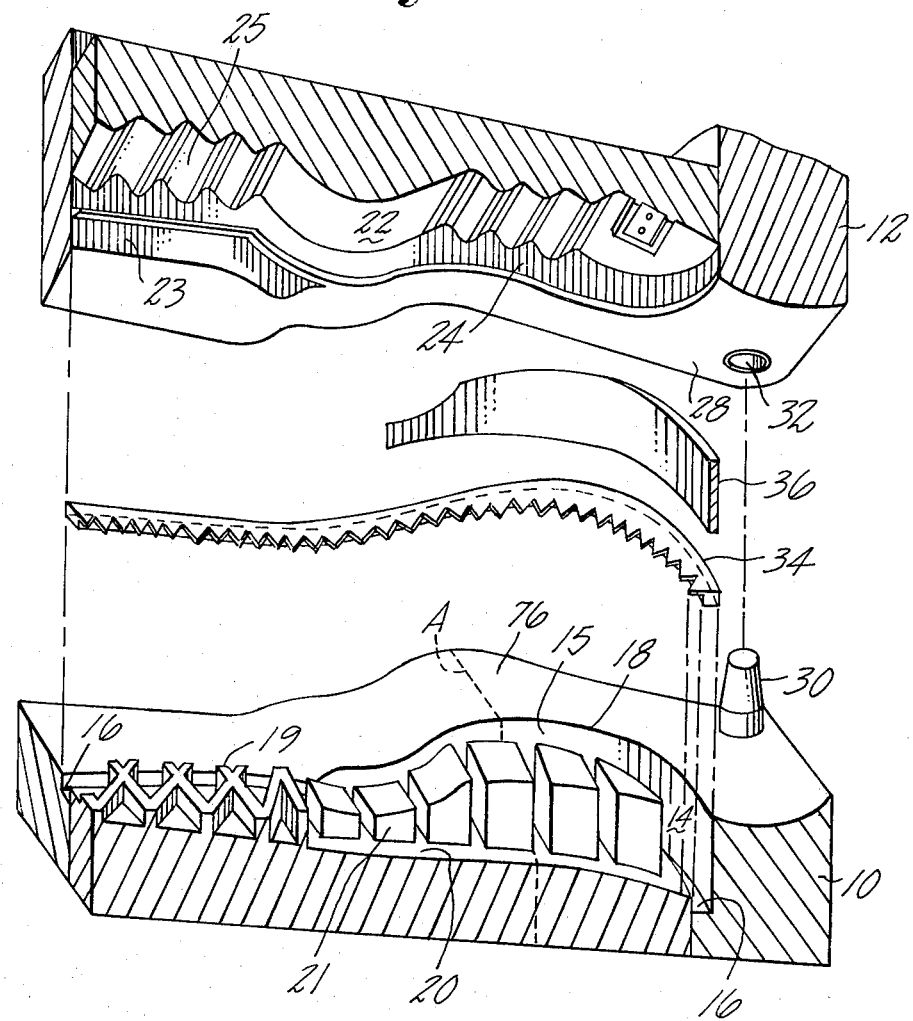
FIG. 1 is an exploded cut-away view of an upper and lower mold pair with portions of inserts shown arranged therebetween.

Referring now to the drawings, and particularly to FIG. 1, there is shown in an exploded side view, a lower mold member 10 and an upper mold member 12, which together form a mold for a unitary shoe sole. The lower and upper mold members, 10 and 12, may each be machined from one or more blocks of metal such as aluminum, and mated together, to form their respective mold-halves, as shown in FIG. 1. That is portions of one mold member may be removable from the overall mold half, 10 and/or 12, as along the plane A, or the portions that define the tread or upper sections of the sole, may be changed for a different portion, which would be securable to the remaining mold by suitable means, not shown.

The entire lower mold member 10 may define the upper and at least part of the sides of a unit shoe sole, wherein the mold is constructed so as to form a lower cavity 14 having a lowermost peripheral trough 16 disposed in a generally planar configuration. The cavity 14 in the lower mold member 10 may be arranged to a depth so as to have a wall 15 which includes and defines substantially the entire vertical dimension of the sole to be molded. In this particular embodiment however, the cavity 14 in the lower mold member 10 has the vertical dimension of the sole to be molded, in the heel portion only. It is to be noted, that the cavity 14 in the lower mold member 10, has a lowermost surface 20 which comprises the top surface of a molded sole. The lower cavity 14 also has rising therefrom, a plurality of ribs 19 and coring 21. The ribs and coring 19 and 21, provide strength to the final molded sole, and they eliminate some of the material therefrom, saving on excess weight and expense.

The upper mold member 12, as shown in FIG. 1, includes a cavity 22 arranged therein. The cavity 22 in the upper mold member 12, has a heel portion 24, which for this embodiment is generally shallow. The remainder of the cavity 22 in this particular embodiment, in the upper mold member 12 has a generally greater depth, that is, a higher wall 23 around the forepart of the sole. The upper cavity 22 may basically comprise the mold portion for a tread design 24 or bottom configuration of the molded sole. The lower and upper mold members, 10 and 12, each have a corresponding curvilinear surface, 26 and 28, which come together in sealing contact during juxtaposition of the mold members, 10 and 12, in the molding operation. The lower mold member 10 may include a plurality of alignment pins 30, only one being shown, each of which may mate with and properly line up with a pin receiving orifice 32 in the upper mold member 12.

Welting which is used to attach a shoe upper to a sole in standard shoe manufacture, is used for decorative purposes to simulate that manufacture in this invention. A portion of welt 34, is shown inverted in a perspective view in FIG. 1, and is shown in crosssection in FIGS. 2 and 3. The welt 34 may be "L" shaped in cross-section and have an inner side of saw-tooth configuration permitting it to be placed easily as a first decorative insert without buckling in the peripheral trough 16 in the lower mold member 10. The saw-tooth configuration of the welt 34 also aids in the adhesion thereof to the molded sole. A second, flat bendable decoration such as leather or the like, which can function as a heel cover 36, or other such decorative insert, may also be placed in the mold cavity 14, against the wall thereof, and on top of the in-place welt 34. It is to be noted that this second insert, the heel cover 36, could extend around most of, or all of the periphery of the lower cavity 14, on top of the welt 36, provided that the wall 15 of the cavity 14 extended correspondingly therearound as well, to provide stability for that second decorative insert during the molding operation.

After insertion of the first and second decorative members, that is, the welt 34 and heel cover 36, into the lower mold member 10, the lower and upper mold members, 10 and 12, are fitted onto one another as shown in FIG. 2, and are securely mated together as shown in FIG. 3. A rubber or plastic-like compound such as polyvinyl chloride or a thermoplastic rubber may be injected as a hot fluid into the lower mold member 10, through a sprue 40, as shown in FIGS. 2 and 3. The compound would then travel through a plurality of channels 42, only one shown here, to deliver the compound to the cavity area and fill it up. The saw-tooth configuration helps hold the welt 34 to the compound comprising the molded sole, and the heel cover 36, which is preferably made from leather, adheres to the sides of the molded sole, to form a multiplicity of permanent decorative attachments on the molded sole.

Thus there has been shown a mold apparatus, for molding shoe soles, wherein the lower mold member has the deeper adapted cavity to enable an operator to insert a first decorative piece within a lower peripheral trough in the lower mold cavity, and a second decorative piece on top of the first decorative piece, in a simple and efficient manner, without having any problems with the decorative pieces falling out of the mold, permitting use of this mold arrangement in existing sole molding machines where only one mold member is necessarily movable, which prevents the molds and the inserts from misaligning themselves before the mold is injected with the proper plastic compound.

I claim:

1. A mold apparatus for casting an article of plastic material such as a unitary shoe sole, comprising:
   a lower mold member having a peripheral wall and lower surface defining a cavity to provide mold surfaces for the sides and top surface of said unitary shoe sole;
   an upper mold member having at least an upper surface therein to provide a mold surface for a tread portion of said unitary shoe sole, said lower and upper mold members juxtaposable to provide a complete mold cavity for said shoe sole;
   an arrangement of passageways to permit the injection of a plastic material into said cavity;
   a lower generally planar peripherally arranged surface is provided in said cavity in said lower mold member to receive a first decorative member, and a peripheral wall surface sufficient in depth and peripheral contour to receive and support thereadjacent a second decorative member on top of said first decorative member.

2. A mold apparatus as recited in claim 1, wherein said peripheral wall extends at least part way around the perimeter of said lower surface of said lower mold member.

3. A mold apparatus as recited in claim 1, wherein at least one of said mold members consists of portions which are replaceable with alternate portions.

4. A mold apparatus as recited in claim 2, wherein said peripheral wall comprises approximately the full height of said unitary shoe sole.

5. A mold apparatus as recited in claim 2, wherein said generally planar peripherally arranged surface is a trough for matably receiving said first decorative member, said first decorative member comprising a strip of welt to be inserted therein.

6. A mold apparatus as recited in claim 2, wherein said peripheral wall supports said second decorative member thereagainst, said second decorative member comprising a side cover which will wrap at least partway around the sides of said shoe sole.

* * * * *